UNITED STATES PATENT OFFICE.

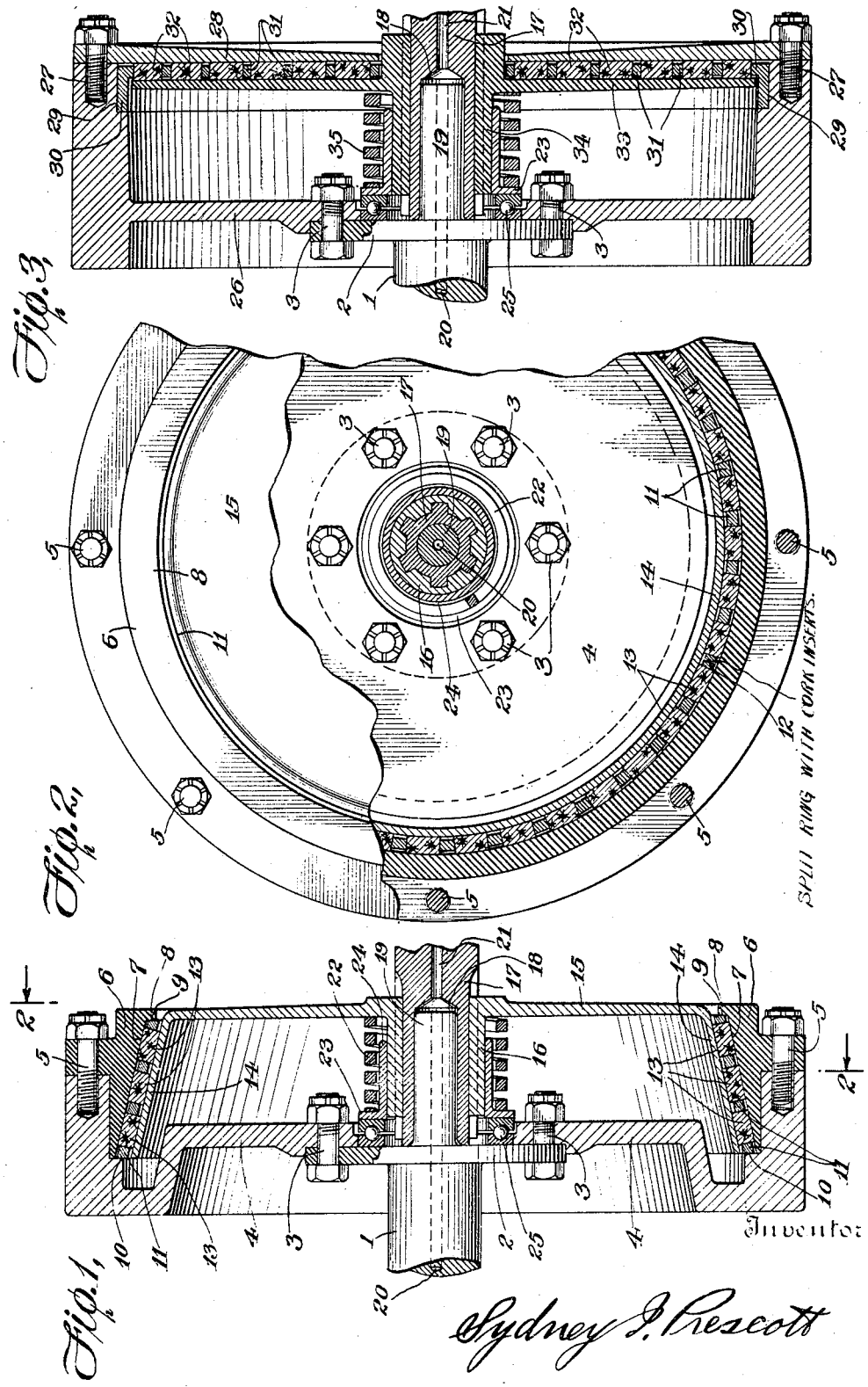

SYDNEY I. PRESCOTT, OF NEW YORK, N. Y.

CLUTCH.

1,274,778.

Specification of Letters Patent.

Patented Aug. 6, 1918.

Application filed November 17, 1916. Serial No. 131,840.

*To all whom it may concern:*

Be it known that I, SYDNEY I. PRESCOTT, a citizen of the United States, residing at New York, county of New York, and State of New York, have invented a new and useful Improvement in Clutches, of which the following is a specification.

This invention relates to an improvement in clutches, particularly of the type used in motor cars, and has for its main object the production of a simple, inexpensive and durable structure for the purposes intended which will be free from the harsh action in clutching inherent in many constructions heretofore known. With these and other objects not specifically mentioned in view, the invention consists in certain constructions and combinations which will be hereinafter fully described and then specifically set forth in the claims hereunto appended.

In the accompanying drawings, which form a part of this specification and in which like characters of reference indicate the same or like parts, Figure 1 is a sectional view of a device constructed in accordance with the invention and of the cone type; Fig. 2 is a cross-sectional view taken on the line 2—2 in Fig. 1, and partly broken away; and Fig. 3 is a sectional view of a modification of the structure shown in Figs. 1 and 2, and of the plate type.

In carrying the invention into effect there is provided a driving member, a driven member, power transmitting means loosely mounted between and adapted for frictional engagement with both of said members, and actuating or clutching and declutching means. In the best constructions, the power transmitting means is supported by one of the members and the actuating means is coöperative with the other member. In the best constructions also, the power transmitting means is provided with operating surfaces of material having a high co-efficient of friction. In the best constructions also, the driving and driven members are both circular in form and the power transmitting means is annular in form and is circumferentially movable with respect thereto except when the members are fully engaged. In the best constructions also, the power transmitting means is expansible, so that as wear occurs the said means will automatically adjust itself to the changed conditions. In the best constructions also, the device is so constructed that an oil pocket is formed in which the power transmitting means works, the operating surface of said means being constructed of a material the friction coefficient of which is but slightly affected by oil, although the wear is materially reduced by its use. All of the above elements may be varied in construction within wide limits. The particular device selected to illustrate the invention is but one of many possible concrete embodiments of the same. The invention therefore is not to be restricted to the precise details of the structure illustrated and described.

Referring to the drawings, 1 indicates a motor crank-shaft provided with an integral flange 2 to which is secured, by means of bolts 3, a flywheel 4. Secured to the flywheel 4, by means of bolts 5, is a driving ring 6 having a female conical driving surface 7 and an inturned flange 8, the inner face of which forms an annular abutment at 9. The flywheel 4 is shaped to form an abutment 10 which coöperates with the abutment 9 to confine against longitudinal movement an annular ring 11, which ring is split at 12 to make it expansible. The ring 11 is studded in a well known manner by cork inserts 13 which project beyond both the inner and outer peripheries of the ring 11. The inner surfaces of the cork inserts 13 are normally in engagement with a male conical driven member 14 which is formed integrally with a web 15 having a hub 16, the hub 16 being splined in a well known manner to a transmission shaft 17. This transmission shaft has an axial bore 18 in one of its ends and is thereby piloted on a tail shaft 19 formed integrally with and projecting rearwardly from the crankshaft flange 2. The tail shaft 19 is provided with an axial aperture 20 and the transmission shaft 17 is provided with a similar axial aperture 21. Through these apertures oil may be forced by the motor oiling devices to the clutch and beyond to the transmission gearing, not shown. Seated against the web 15 is a coiled spring 22, one end of which bears against the flange 23 of the sleeve 24 which sleeve surrounds the hub 16, pilots the spring 22, and serves as a stop to limit declutching movement of the web 15. The flange 23 bears against a ball thrust bearing indicated at 25, the thrust bearing in turn bearing against the crankshaft flange 2.

The ring 11 is made of a diameter, and the cork inserts are so positioned therein that the latter are always in frictional engagement with the surface 7 of the driving ring 6 and are slightly compressed by such engagement, so that there will be no rattle and no eccentric displacement of the ring when the clutch is disengaged. While this frictional engagement is sufficient to cause the power transmitting means to rotate with the flywheel without slippage when the clutch is disengaged, it is not sufficient to transmit the full power of the motor when the clutch is engaged. When the male cone 14 is brought into contact with the inner surfaces of the cork inserts during the clutching operation, the pressure upon the cork inserts is increased and the frictional engagement of the outer surfaces of the cork inserts with the driving surface 7 of the ring 6 is correspondingly increased. At first contact, however, a slippage will occur between the male cone 14 and the inner surfaces of the cork inserts, particularly when there is a pocket of oil around the inner periphery of the flywheel, held there by the driving ring flange 8. The cork inserts may be long enough to prevent actual contact of the outer and inner surfaces of the ring 11 with the driving surface 7 and the surface of the driven member 14 when the parts are in full engagement, but even when such is not the case oil will flow in between the surfaces when the parts are disengaged, the flange 8 being deep enough to insure the presence of a thin ring of oil within the annular oil pocket formed by the inner periphery of the flywheel and driving ring 6 out beyond the flange 8. A very small quantity of oil is sufficient for a run of thousands of miles for the reason that there is no slip and consequently no need for oil except when clutching. As engagement progresses, the pressure upon the inner surfaces of the cork inserts becomes equal to that upon the outer surfaces in engagement with the driving surface 7 of the driving ring 6; and when this occurs the male cone 14 may continue to slip, or the ring 11 may slip, or both, and this slippage will continue until the clutch is fully engaged, it being of course understood that the thrust of the spring 22 is sufficient to prevent slippage under full power and full clutch engagement. Engagement without shock is thus effected. Declutching is effected by mechanism bearing upon the web 15 close to the transmission shaft 17 and acting to move said web toward the flange 2 against the action of the spring 22, and this mechanism may be of any of the well known types. Its particular construction lies wholly outside of the present invention, and description and illustration thereof is therefore omitted in the interest of brevity and clearness.

In the modification illustrated in Fig. 3, there is provided a flywheel 26 to which is secured, by means of bolts 27, a plate 28, which forms a driving member. The flywheel is counter-bored at 29 and in this counter-bore is located the flange 30 of a plate 31, this plate being studded with cork inserts 32 and forming power transmission means. Bearing against the cork inserts 32 is a plate 33 forming a driven member and provided with a hub 34 splined upon the transmission shaft 17. The driven member or plate 33 is held against the cork inserts by means of a spring 35, the flanged sleeve 24, and ball thrust bearing 25, as in the structure shown in Figs. 1 and 2. The operation of this form of the invention will be readily understood in view of the explanation hereinbefore given of the operation of the structure shown in Figs. 1 and 2.

What is claimed is:

1. In a clutch, the combination with a driving member, of a driven member, both of said members having uninterrupted coordinated operating surfaces, and frictional power transmitting means seated in and confined by one of said members in constant contact with its operating surface and located between and circumferentially movable with respect to both of said surfaces.

2. In a clutch, the combination with a driving member, of a driven member, both of said members having uninterrupted coordinated operating surfaces, and frictional power transmitting means wholly supported by one of said members and seated and confined therein in constant contact with its operating surface and located between and circumferentially movable with respect to both of said surfaces.

3. In a clutch, the combination with a driving member, of a driven member, both of said members having uninterrupted coordinated operating surfaces, and frictional power transmitting means wholly supported by said driving member and seated in and confined thereby in constant contact with its operating surface and located between and circumferentially movable with respect to both of said surfaces.

4. In a clutch, the combination with a driving member, of a driven member, both of said members having uninterrupted coordinated operating surfaces, and frictional power transmitting means seated in and confined by one of said members in constant contact with its operating surface and located between and circumferentially movable with respect to both of said surfaces, said power transmitting means being provided with operating surfaces of material having a high co-efficient of friction.

5. In a clutch, the combination with a driving member, of a driven member, both of said members having uninterrupted coordinated operating surfaces, and cork studded power transmitting means between and circumferentially movable with respect to said members, the corks being in constant engagement with the driving member.

6. In a clutch, the combination with a circular driving member, of a circular driven member, both of said members having uninterrupted coördinated operating surfaces, and frictional power transmitting means wholly supported by one of said members and seated and confined therein in constant contact with its operating surface and located between and circumferentially movable with respect to both of said surfaces.

7. In a clutch, the combination with a circular driving member, of a circular driven member, both of said members having uninterrupted coördinated operating surfaces, and a split annular frictional power transmitting ring seated in and confined by one of said members in constant contact with its operating surface and located between and circumferentially movable with respect to both of said surfaces.

8. In a clutch, the combination with a conical driving member, of a conical driven member, both of said members having uninterrupted coördinated operating surfaces, and frictional power transmitting means seated in and confined by one of said members in constant contact with its operating surface and located between and circumferentially movable with respect to both of said surfaces.

9. In a clutch, the combination with a female conical driving member, of a male conical driven member, both of said members having uninterrupted coördinated operating surfaces, and frictional power transmitting means seated in and confined by one of said members in constant contact with its operating surface and located between and circumferentially movable with respect to both of said surfaces.

10. In a clutch, the combination with a fly wheel, of an annular female conical driving member carried thereby, a male conical driven member, both of said members having uninterrupted coördinated operating surfaces, and a split annular conical expansible power transmitting ring between and circumferentially movable with respect to said members.

11. In a clutch, the combination with a circular driving member, of a circular driven member, and expansible power transmitting means loosely mounted and circumferentially movable between and adapted for frictional engagement with both said members one of said members being arranged to prevent longitudinal movement of said means.

12. In a clutch, the combination with a driving member, of a driven member, and expansible power transmitting means loosely mounted between and adapted for frictional engagement with both said members said means being circumferentially movable with respect to both said members when out of engagement.

13. In a clutch, the combination with a flywheel, of an annular female conical driving member carried thereby said member being arranged to form an oil pocket, a male conical driven member, and a split annular conical expansible power transmitting ring mounted within the oil pocket and between and circumferentially movable with respect to said members.

14. In a clutch, the combination with a flywheel, of a driving ring bolted to the flywheel and having a conical driving surface, a conical driven member, and a split annular expansible power transmitting ring provided with cork inserts and mounted between and circumferentially movable with respect to said members, the corks being in constant engagement with the driving surface.

15. In a clutch, the combination with a driving member, of a driven member, one of said members being arranged to form an oil pocket, and both of said members having uninterrupted coördinated operating surfaces, and frictional power transmitting means mounted within the oil pocket and between and circumferentially movable with respect to said members.

16. In a clutch, the combination with a driving member, of a driven member, both of said members having uninterrupted coördinated operating surfaces, and a single frictional power transmitting device seated in and confined by one of said members in constant contact with its operating surface and located between and circumferentially movable with respect to both of said surfaces, said power transmitting device being provided with operating surfaces of material having a high co-efficient of friction.

17. In a clutch, the combination with a driving member, of a driven member, and a single cork studded power transmitting device between and circumferentially movable with respect to said members, the corks being always slightly compressed by constant engagement with one of said members.

18. In a clutch, the combination with a driving member, of a driven member, and a single cork studded power transmitting device between and circumferentially movable with respect to said members, the corks being always slightly compressed by constant engagement with the driving member.

19. In a clutch, the combination with a driving member, of a driven member, both of said members having uninterrupted coördinated operating surfaces, and a single frictional power transmitting device seated in and confined by one of said members in constant contact with its operating surface and located between and circumferentially movable with respect to both of said surfaces.

20. In a clutch, the combination with a driving member, of a driven member, both of said members having uninterrupted coordinated operating surfaces, and a single frictional power transmitting device wholly supported by said driving member and seated in and confined thereby in constant contact with its operating surface and located between and circumferentially movable with respect to both of said surfaces.

In testimony whereof, I have signed my name to this specification.

SYDNEY I. PRESCOTT.